3,696,082
VINYLIDENE CHLORIDE-LONG CHAIN ALKYL ESTER POLYMER

David R. Smith, Decatur, Ill., assignor to A. E. Staley Manufacturing Company, Decatur, Ill.
No Drawing. Filed June 3, 1970, Ser. No. 43,227
Int. Cl. C08f 15/40
U.S. Cl. 260—80.8    11 Claims

ABSTRACT OF THE DISCLOSURE

Vinylidene chloride emulsion copolymers in which 89–95 percent of the monomers consists of 88–94 parts vinylidene chloride and 1–5 parts $C_{10-24}$ alkyl ester of alpha, beta-ethylenically unsaturated carboxylic acids. The copolymer emulsions yield films, especially coatings on glassine paper, having valuable oxygen-barrier, heat-seal, and slip characteristics.

DISCLOSURE OF THE INVENTION

This invention relates to polyvinylidene chloride emulsion polymers (latexes) containing a built-in slip and antiblocking agent.

Glassine coated with vinylidene chloride copolymer latex is now being used for packaging snack foods and cereals. The vinylidene chloride copolymer latex forms a protective coating which is tough, inert to a large number of chemicals, such as water, oils and fats, and relatively impermeable to many gases including oxygen. In order to be usable on high-speed package-forming, "form-and-fill" equipment, the coated glassine must not block and must have good slip, and the polyvinylidene chloride coating must have good heat-sealing properties (i.e. heat seal to itself rapidly at relatively low temperature). Unfortunately, the better the heat-seal properties of the polyvinylidene chloride coating, the poorer the slip and the worse the blocking. For this reason, polyinvylidene chloride latexes are applied only to one side of the glassine. In spite of higher costs and other problems associated with the use of organic solvents, the other side of the glassine is coated with an organic solution of polyvinyl acetate or other polymer. Although U.S. Patent 3,428,483 indicates that it is common to add clays to polyvinylidene chloride latexes in order to improve slip and reduce blocking, this technique is undesirable since clays tend to reduce the barrier properties and resistance of the polyvinylidene chloride layer and complicate the coating operation.

The object of this invention is to provide a stable polyvinylidene chloride latex capable of depositing a coating on both sides of a glassine substrate that is non-blocking, fat-resistant, oxygen-impermeable and has good slip and heat seal properties. Other objects will appear hereinafter.

The objectives of this invention are attained with a vinylidene chloride copolymer latex comprising an emulsion copolymer of (A) 88 to 94% by weight vinylidene chloride and (B) 1 to 5% by wegiht long chain alkyl esters of alpha, beta-ethylenically unsaturated carboxylic acids containing from 10 to 24 carbon atoms in the alkyl group, wherein the total of components (A) and (B) comprise from 89 to 95% by weight of the copolymer. In contrast to prior are polyvinylidene chloride latexes, the products of this invention are capable of depositing (on both sides of a glassine substrate) a non-blocking coating with good slip and heat seal properties.

The long chain alkyl esters of alpha, beta-ethylenically unsaturated carboxylic acids containing from 10 to 25 carbon atoms in the alkyl group act as internal slip and anti-blocking agents in the vinylidene chloride copolymer coatings. If the long chain alkyl ester is less than 1% by weight of the copolymer, the deposited film tends to adhere to a second layer of polyvinylidene chloride (i.e. it blocks and does not slip). As the concentration of long chain ester increases up to about 5% by weight of the copolymer, the block resistance and slip of the deposited film increase. If the long chain alkyl ester comprises more than 5% by weight of the copolymer, or the total content of long chain alkyl ester and vinylidene chloride is more than 95% by weight of the copolymer, then coatings from latex are excessively brittle and the latex is unsuitable for the coating of glassine. Further, if the long chain alkyl ester and vinylidene chloride comprise more than 95% by weight of the copolymer, the polymer latex lacks the necessary stability and tends to crystallize prematurely. Accordingly, the long chain alkyl ester can be used in a concentration of about 1 to 5% by weight of the monomers with 1.5 to 4% by weight yielding the best results. Suitable long chain alkyl esters of alpha, beta-ethylenically unsaturated carboxylic acids include the long chain esters of alpha, beta-ethylenically unsaturated monocarboxylic acids such as, isodecyl methacrylate, decyl acrylate, undecyl acrylate, lauryl (mixture of $C_{12}+C_{14}$) methacrylate, tridecyl acrylate (mixture of isomers), stearyl (mixture of $C_{16}+C_{18}$) methacrylate, octadecyl acrylate, tetracosyl acrylate, etc.

Vinylidene chloride can comprise from about 88 to 94% by weight of the monomers. In general, as the concentration of vinylidene chloride in the copolymer increases, the oxygen resistance (barrier properties) of the applied coating increases. On the other hand, as the concentration of vinylidene chloride and the total concentration of vinylidene chloride and long chain alkyl acrylate increases, the stability of the latex decreases. When the latex polymer contains 89.5 to 91.5% by weight vinylidene chloride, 1.5 to 4% by weight long chain alkyl ester and these monomers comprise 91 to 95% by weight, the polymer has optimum properties (i.e., the latex is stable, the applied coating is substantially oxygen-impermeable and non-blocking, and has good slip and good heat seal properties).

The copolymer contains from about 3 to 11% by weight (preferably 5 to 9% by weight) copolymerizable monoethylenically unsaturated monomer having a molecular weight less than 185 (preferably less than 125) and from 0 to 2% by weight diethylenically unsaturated copolymerizable monomer. One or more of these monomers are necessary in order to prevent premature crystallization of the polymer prior to application and are necessary in order to impart the required flexibility and heat-sealing properties to the dried coating. The monoethylenically unsaturated monomers having a molecular weight less than 125 are preferred since these monomers are more effective in preventing premature crystallization.

Suitable copolymerizable monoethylenically unsaturated monomers include alpha, beta-ethylenically unsaturated carboxylic acids, such as acrylic acid, methacrylic acid, itaconic acid, monomethyl itaconate, itaconic anhydride, etc.; alkyl esters of alpha, beta-ethylenically unsaturated monocarboxylic acids containing from 1 to 8 carbon atoms in the alkyl group, such as methyl acrylate, ethyl acrylate, butyl acrylate, 2-ethyl hexyl acrylate, 2-ethoxyethyl acrylate, methyl methacrylate, ethyl alpha-cyanoacrylate, etc.; alpha, beta-ethylenically unsaturated nitriles, such as acrylonitrile, methacrylonitrile, ethacrylonitrile, etc.; alpha, beta-ethylenically unsaturated amides, such as methacrylamide, acrylamide, etc.; monovinyl aromatics, such as styrene, vinyltoluene, etc.; vinyl halides, such as vinyl chloride, vinyl bromide, etc.; diesters of alpha, beta-ethylenically unsaturated dicarboxylic acids, such as dimethyl itaconate, diethyl fumarate, dimethyl maleate, etc.; alkyl vinyl ethers, such as methyl vinyl ether, ethyl ether, etc.; alkylvinyl ketones, such as methyl vinyl ketone, etc.

Suitable diethylenically unsaturated monomers include allyl crotonate, allyl acrylate, polyhydric alcohol esters of alpha, betaethylenically unsaturated monocarboxylic acids, such as 1,3-butylene dimethacrylate, the diacrylate or dimethyacrylate of ethylene glycol, diethylene glycol, triethylene glycol, etc.

Briefly, the polyvinylidene chloride latexes of this invention are prepared by initiating the polymerization of a minor proportion of the monomers in emulsion and continuing the polymerization while adding the major proportion of the monomers to be polymerized and of components of the initiator system. The general techniques for emulsion polymerization of vinylidene chloride copolymers are known to those skilled in the art.

The dispersing agents or emulsifiers for use in this invention are the anionic and nonionic surface-active agents. The anionic surface active agents are preferred because they have been found to yield polymers of the desired particle-size at lower emulsifier concentration than those required when nonionic surface active agents are used. Suitable anionic surface active agents include alkali metal salts of alkaryl sulfonates, such as sodium dodecyl-benbene sulfonate, sodium diamylnaphthalene sulfonate, disodium 4 - dodecyl - oxybenzenedisulfonate, etc.; alkali metal salts of alkyl sulfates, such as sodium lauryl sulfate, sodium myristyl sulfate, etc. Suitable nonionic surface active agents include the alkylphenyl esters of polyoxyethylene glycols and alkyl ethers of polyoxyethylene glycols containing from 4 to 18 carbon atoms in the alkyl group and from about 2 to 120 oxyethylene units. These compounds can be used in a weight concentration of about 0.1 to 6% of the total monomer weight with about 0.5 to 3% being best. The most advantageous concentration will depend, as in all emulsion polymerizations, in part on the emulsifier or emulsifiers used, the monomers to be polymerized, the desired particle size, the initiator system, etc.

As polymerization initiators, there may be used one or more of the peroxidic compounds known to act as free radical initiators. The initiator can be soluble in the aqueous phase of the emulsion or soluble only in the monomer phase, or both. Among the useful initiators for the present type of copolymerization are inorganic peroxides and organic peroxides and hydroperoxides. These include hydrogen peroxide, benzoyl peroxide, tertiary-butyl hydroperoxide, diisopropylbenzene hydroperoxide, cumene hydroperoxide, caproyl peroxide, methylethyl ketone peroxide, etc. Other free-radical initiators are also useful, such as azodiisobutyronitrile and other aliphatic azo compounds of the type having an acyclic azo group and an aliphatic carbon atom on each nitrogen, at least one of which is tertiary. In part, the particular combination of monomers governs the selection of the initiators since some monomers respond better to one variety than they do to another.

The amount of peroxidic initiator required is about proportional to the amount of monomers used. The usual range is 0.01% to 3% of initiators with reference to the weight of the monomers. The preferred range is about 0.10 to 1.0% while the range of 0.1–0.4% is usually best. The optimum amount of initiator is determined in large part by the nature of the particular monomers selected, including impurities which accompany particular monomers. In general, it is preferred to use the lowest concentration of initiator sufficient to give the desired rate of conversion since the higher the initiator concentration the lower the molecular weight of the polymer and the poorer its barrier properties.

Frequently, a promoter for the initiator is used to hasten the reaction at a temperature low enough to avoid coagulation. The promoter may be a reducing agent and its combination with the peroxidic initiator is frequently referred to as a "redox system." Many examples of such systems are known and the promoters include ascorbic acid, ferrous salts, and soluble reducing sulfur compounds such as sulfite, hydrosulfites, sulfoxalate, thiosulfate, and bisulfites. Particular promoters are exemplified by sodium hydrohulfite, sodium meta-bisulfites, zinc or sodium formaldehyde sulfoxalate, in small concentrations, particularly ferrous ion in the form of ferrous ammonium sulfate at concentrations of a few parts of ferrous ion per million.

The amount of promoter required varies, as is known, with the free-radical initiator chosen and with the particular promoter. The initiator requirement may also be partly governed by the particular monomers and by the emulsifying agent employed. At the outside, not more than 3% or less than 0.01% of promoter is used in these situations. The preferred range of ascorbic acid is at the low end of this range up to about 0.1% while sulfites are used preferably in an amount of 0.1 to 1%.

Polymerization is best effected below about 95° C. The preferred range is about 30 to 70° C. and the bottom portion of the range (30 to 45° C. is particularly preferred to initiate the polymerization. Slightly lower temperatures, down to 0° C., are permissible. After most of the monomers have been converted to polymer, temperatures even higher than 95° C. may be employed. During polymerization, the temperature can be controlled in part by the rate at which monomers are supplied and polymerized and/or by applied cooling.

The polymerization process can be carried out either batchwise or continuously. It is possible to work entirely batchwise by emulsifying the entire content of monomer and proceeding with polymerization. It is usually advantageous, however, to start with part of the monomers to be polymerized and add more monomer or monomers as polymerization proceeds. Gradual or incremental addition of monomer (either continuous or periodic is advantageous in maintaining optimum control of reaction conditions, while reaching high solids content. Initiators or components of the redox initiating system may be added as the polymerization proceeds and these can be used to control the speed of reaction so as to avoid overheating. When the addition of the monomer is gradual or delayed, it is desirable to use part or all of the emulsifier to emulsify the monomers before adding the monomers to the polymerization zone and/or to prepare and add a "seed" latex. Addition of the long chain alkyl ester in emulsified form is preferred as this facilitates uniform copolymerization with the vinylidene chloride. Other things being equal, polymers formed by addition of the long chain alkyl ester comonomer in emulsified form have flexibility and elongation that are markedly superior to those prepared using other techniques. Moreover, aside from causing loss of monomer, incomplete copolymerization of the long chain alkyl esters results in the formation of undesirable coagulum and in the separation of oily material which may interfere seriously with the attainment of uniform films in the application of the vinylidene chloride emulsion polymer to glassine paper. Initiation of the polymerization reaction in the presence of seed latex is advantageous, because it reduces the polymerization induction period and lessens any tendency of the latex to coagulate in the initial stages.

In general, it is preferred to add preformed latex polymer particles ("seed") to the polymerization reaction mixture in the manner described in U.S. Pat. 3,424,706. This method facilitates the formation of a high solids polydisperse polyvinylidene chloride latex capable of application to glassine at high total solids in high speed coating equipment.

The preferred method of preparing the vinylidene chloride emulsion copolymers of this invention comprises the steps of: (1) initiating the polymerization of vinylidene chloride in the presence of preformed addition polymer in latex form having an average diameter less than the average diameter of the ultimate polydisperse polyvinylidene chloride (0.01 to 0.12 micron); (2) adding at a predetermined rate an emulsion of additional monomer including the long chain alkyl ester, and polymerizing said monomers; (3) during step (2), adding additional particles of preformed addition polymer in latex form, the additional particles having an average diameter less than the average diameter of the ultimate vinylidene chloride polymer; and (4) terminating the polymerization at a predetermined solids content, usually in the range of about 50 to 75% solids, preferably 55 to 65% solids.

While the polyvinylidene chloride latexes of this invention are particularly suitable for coating both sides of glassine, these latexes can be used to coat various other substrates, such as aluminum foil, paper, paperboard, etc. on one or both sides.

The following examples are merely illustrative and should not be construed as limiting the scope of the invention.

EXAMPLE 1

This example illustrates one desirable method of making the vinylidene chloride copolymers of this invention. The method is characterized by relatively short reaction time and easily reproducible product. The following premixtures were prepared to be used in the preparation of a preferred polyvinylidene chloride latex:

Basic emulsifier-monomer
premixture:                                             Parts (wet wt.)
  Vinylidene chloride _____ 2184
  Methyl acrylate _____ 144
  Acrylic acid _____ 12
  Seed latex (20% dry solids) _____ 200
  Sodium dodecylbenzene sulfonate (23% dry
    solids) _____ 160
  Sodium lauryl sulfate (29% dry solids)____ 24.1
  Disodium monodecylphenoxybenzene disulfonate (45% dry solids) _____ 15.5
  Water _____ 315
Delayed addition to emulsifier-monomer
premixture:
  Isodecyl methacrylate _____ 60
Reactor charge:
  NaH$_2$PO$_4$·H$_2$O _____ 1.2
  Na$_2$HPO$_4$ _____ 3.0
  Citric acid·H$_2$O _____ 0.4
  Water _____ 320
  Seed latex (20% dry solids) _____ 100
  Hydrogen peroxide (2%) _____ 120
Promoter:
  Ascorbic acid (1%) _____ 145
Delayed initiator:
  Hydrogen peroxide (2%) _____ 120
Additional promoter:
  Ascorbic acid (2%) _____ 50
Post additives:
  Sodium dodecylbenzenesulfonate (23% dry
    solids) _____ 60
  Sodium hydroxide (10%) _____ 33

A water-cooled reactor was charged with the above-described reactor charge. To this charge, 100 parts of the basic emulsifier-monomer premixture was added. Then, the isodecyl methacrylate was added to the balance of the emulsifier-monomer premixture to make the modified emulsifier-monomer premixture. The reactor contents were warmed to 30° C. and the pressure in the reactor reduced to about 20 in. mercury. Ascorbic acid promoter was added at a rate of 24.6 parts per hour.

When the mixture had warmed to 39.5° C., the addition of the modified emulsifier-monomer premixture was begun at a rate of 218 parts/hour and increased to 443 parts/hour twenty minutes after the addition of the premixture had been started. The temperature of the reaction was maintained below 44.5° C. by external cooling, as required. Forty minutes after the addition of the modified emulsifier-monomer mixture was started, the rate of its addition was increased gradually to 664 parts per hour. Foam was eliminated by admitting nitrogen above the reaction mixture. About 15 minutes before one-half of the modified emulsifier-monomer premixture had been added, the addition of the delayed initiator was started and continued at a uniform rate (about 51 parts per hour) during the addition of the modified emulsifier-monomer mixture. The reactor temperature was maintained at 47–49° C. by external cooling as required.

After the addition of the modified emulsifier-monomer mixture was complete, the reactor was maintained at 47–49° C. for an hour with continuing addition of the promoter at the original rate. During the next one hour period, the temperature of the reactor charge was raised to 60° C. and the additional promoter was added.

The reactor contents were then cooled to 49° C., and the pH was adjusted to 3–4 with 10 percent sodium hydroxide solution. The post-additive sodium dodecylbenzenesulfonate was added, the mixture was filtered. Any residual monomer was removed. To destroy any residual hydrogen peroxide, peroxidase enzyme or aqueous sodium sulfite can be added. When peroxidase is used, the solution is first cooled to around 25° C. and its pH is suitably adjusted for optimal enzyme activity, typically to 4.7±0.2. If sodium bisulfite is added, the final pH should be about 4.0.

The emulsifier monomer premixture was prepared as follows. The sulfonates were dissolved in 283 parts water, and the solution warmed to 27.7° C. The monomers (vinylidene chloride, methyl acrylate, acrylic acid) were added to the warm solution. The seed latex, previously adjusted to 4.7±0.2 pH with sodium hydroxide solution, was added followed by 32 parts water. The resultant mixture was stirred vigorously for 5 minutes at 22–28° C.

The seed latex was prepared as follows. A water-cooled reactor was charged with 0.2 part by weight

0.15 part citric acid, 60 parts by weight of water, 4 parts by weight of 2% H$_2$O$_2$ and 300 parts by weight of an emulsifier composition composed of 56.0 parts by weight of sodium dodecylbenzene sulfonate (23% dry solids), 5.5 parts by weight of sodium lauryl sulfate (29% dry solids), 3.5 parts by weight disodium monodecylphenoxybenzene disulfonate (45% dry solids) and 15 parts by weight water. After temperature was adjusted to 40° C., 281 parts by weight of an emulsified monomer composition containing 180 parts by weight vinylidene chloride, 18 parts by weight methyl acrylate, 2 parts by weight acrylic acid and 20 parts by weight of the above described emulsifier composition was added to the reactor. The remaining 252 parts of the monomer composition was added to the reactor after the reaction had started at a rate of about 3 parts by weight per minute. At the same time 6 parts by weight of ascorbic acid (1.1% by weight dry solids) was added over a period of 2 hours while the reactor was being maintained at 40–45° C. The batch was cooled to 27° C., and the remaining 30 parts of the above described emulsifier composition was added.

It should be noted that the modified emulsifier-monomer premixture (containing the isodecyl methacrylate) is an oil-in-water emulsion, as are the polymerizing reactor contents. If the water content of the addendum were greatly reduced, then one would expect a water-in-oil emulsion to form instead; such an emulsion on addition to the oil-in-water emulsion in the reactor would be likely to undergo inversion.

EXAMPLE 2

Listed below are the monomers and their proportions employed in making a number of new latexes, and characteristics of films obtained therefrom.

| | 1 | 2 | 3 | 4 | 5 | 6 |
|---|---|---|---|---|---|---|
| Vinylidene chloride | 91 | 91 | 91 | 91 | 91 | 90 |
| Methyl acrylate | 4.5 | 6 | 6 | 6.5 | 6 | 6.5 |
| Stearyl methacrylate | | | | | 2 | 3 |
| Lauryl methacrylate | 3 | 2 | | | 1 | |
| Isodecyl methacrylate | | | 2.5 | | | |
| 1,3-butylene glycol dimethacrylate | 1 | | | | | |
| Methacrylic acid | 0.5 | | | | | |
| Acrylic acid | | 0.5 | 0.5 | 0.5 | 0.5 | 0.5 |
| Butyl acrylate | | 0.5 | | | 1.5 | |
| Total | 100.0 | 100.0 | 100.0 | 100.0 | 100.0 | 100.0 |
| Viscosity, centipoises | 42 | 42 | 41 | 29 | 23 | 28.5 |
| Surface tension, dynes per cm | 39 | 39 | 39 | 39 | 39 | 38.7 |
| Elongation 0.2″/min | 1.0 | 3 | 11 | 1.5 | 20 | 30 |
| Moisture-vapor transmission: | | | | | | |
| Flat | 0.30 | 0.35 | 0.24 | 0.23 | 0.30 | 0.28 |
| Folded | 0.29 | 0.37 | 0.27 | 0.25 | 0.31 | 0.33 |
| Blocking: | | | | | | |
| Front-front | 10 | 9 | 10 | 10 | 4 | 8 |
| Front-back | 10 | 10 | 10 | 10 | 10 | 9 |
| Minimum heat seal temperature, °F | 250 | 240 | 250 | 250 | 240 | 240 |

The glassine paper was coated on a laboratory paper coater (Keegan Company, Detroit, Mich.). The coater was modified by addition of a coating station with its own infrared dryer 4′4″ before the original coating station. Each of the two coating stations had a #5 wire-wound metering rod and a smooth rod rotataed at about 1 r.p.m. A cooling air stream was applied to the paper before entering the second coating station. The paper traveled at about 35 feet per minute during the coating operation.

The test values listed were obtained by conducting the following tests.

Elongation

For elongation measurements, film was cast on glass and dried at 130° C. for 60 seconds; the film was removed from the glass and dried for 2 hours at 50° C. The dried film was 0.8 ml. (0.0008 inch) thick. Elongation at break was measured on ½ inch wide strips of an Instron Tester.

Moisture-vapor transmission

This test was conducted by measuring the rate (grams/100 square inches in 24 hours) of water vapor permeating the sample at 100° F. from 90% to essentially 0% relative humidity. The samples were exposed with the polyvinylidene chloride coating next to the high humidity. The procedure used is the procedure of the Glassine and Greaseproof Manufacturers Association: Flat Moisture Vapor Transmission Test (Rhinelander Method). Samples were run flat and folded as described in TAPPI method T465 SM-52.

Blocking

Blocking was determined on 2-inch by 2-inch test squares of coated paper at 125° F. with the aid of the Interchemical Block Tester. Blocking was rated as follows:

Numerical rating: Description
9–10 Separated by sample weight.
7–8 Separated by light sliding force.
5–6 Separated by sliding force with audible tick.
3–4 Pulled apart, slight picking.
1–2 Pulled apart, much picking.
0 Complete seal.

A rating of 7 or more was considered acceptable.

Minimum heat seal

This test was run on a Sentinel Laboratory Heat Sealer. A one-inch wide strip of coated glassine paper was folded with coated surfaces in contact, and subjected to 10 lbs. per square inch pressure for ¾ second at various temperatures, and then the sealed specimen was pulled apart. The tearing of fiber indicates that sealing has occurred. The lowest temperature at which fiber tearing during pulling occurred was designated at heat seal temperature.

Since many embodiments of this invention may be made and since many changes may be made in the embodiments described, the foregoing is interpreted as illustrative and the invention is defined by the claims appended hereafter.

What is claimed is:

1. A stable vinylidene chloride emulsion copolymer said copolymer comprising (A) about 88 to 94% by weight of vinylidene chloride, (B) about 1 to 5% by weight of a least one long chain alkyl ester of an alpha, beta-ethylenicaly unsaturated monocarboxylic acid, said alkyl ester containing from 10 to 24 carbon atoms in the alkyl group, (C) about 3 to 11% by weight of monoethylenically unsaturated monomer having a molecular weight less than 185, and (D) up to 2% by weight of diethylenically unsaturated monomer, wherein the total of monomers (A) and (B) comprises from 89 to 95% by weight of the copolymer.

2. The vinylidene chloride emulsion copolymer of claim 1 wherein said long chain ester comprises stearyl methacrylate.

3. The vinylidene chloride emulsion copolymer of claim 1 wherein said long chain alkyl ester comprises lauryl methacrylate.

4. The vinylidene chloride emulsion copolymer of claim 1 wherein said copolymer comprises isodecyl methacrylate.

5. The vinylidene chloride emulsion copolymer of claim 1 wherein said copolymer comprises (A) 89.5 to 91.5% by weight of vinylidene chloride, (B) 1.5 to 4% by weight of long chain alkyl ester and wherein the total of monomers (A) and (B) comprises from 91 to 95% by weight of the copolymer.

6. The vinylidene chloride emulsion copolymer of claim 5 wherein said copolymer comprises from 5 to 9% by weight of monoethylenically unsaturated monomer having a molecular weight less than 125.

7. A substrate bearing a non-blocking vinylidene chloride copolymer coating, having good slip and heat seal properties, said copolymer comprising (A) 88 to 94% by weight of vinylidene chloride, (B) 1 to 5% by weight of at least one long chain alkyl ester of an alpha, beta-ethylenically unsaturated monocarboxylic acid, said alkyl ester containing from 10 to 24 carbon atoms in the alkyl group, (C) about 3 to 11% by weight of monoethylenically unsaturated monomer having a molecular weight less than 185. (D) up to 2% by weight of diethylenically unsaturated monomer, wherein the total of monomers (A) and (B) comprises from 89 to 95% by weight of the copolymer.

8. The article of claim 7 wherein said substrate is glassine.

9. The article of claim 8 wherein said glassine is coated on both sides with said copolymer.

10. A process for preparing a stable vinylidene chloride emulsion copolymer said copolymer comprising (A) 88 to 94% by weight of vinylidene chloride, (B) 1 to 5% by weight of at least one long chain alkyl ester of an alpha, beta-ethylenically unsaturated monocarboxylic acid, said alkyl ester containing from 10 to 24 carbon atoms in the alkyl group, (C) about 3 to 11% by weight of monoethylenically unsaturated monomer having a molecular weight less than 185, and (D) up to 2% by weight of diethylenically unsaturated monomer, wherein the total of monomers (A) and (B) comprises from 89-95% by weight of the monomers, said process comprising the steps of:

(1) preparing an emulsion comprising the long chain alkyl ester of an alpha, beta-ethylenically unsaturated carboxylic acid and about 80 to 99 percent by weight of the balance of the monomers to be polymerized;

(2) initiating the polymerization of the remaining monomers to be polymerized that were not emulsified in step (1), under emulsion polymerization conditions;

(3) adding the emulsion prepared in step (1) to the monomers in step (2) at a predetermined rate and polymerizing said monomers; and (4) terminating the polymerization of the monomers in step (3) at a predetermined copolymer solids content in the range of about 50 to 75% by weight of copolymer solids in the emulsion.

11. The method according to claim 10 in which preformed vinylidene chloride emulsion polymer is present when the polymerization is initiated in step (2) and in which performed vinylidene chloride emulsion polymer is added with the emulsion in step (3).

References Cited

UNITED STATES PATENTS

| | | | |
|---|---|---|---|
| 3,235,525 | 2/1966 | Woodard | 260—29.6 |
| 3,297,666 | 1/1967 | MacPherson | 260—80.5 |
| 3,317,450 | 5/1967 | Grenley et al. | 260—29.7 |
| 3,353,992 | 11/1967 | Grenley et al. | 117—138.8 |
| 3,497,481 | 2/1970 | Blood et al. | 260—78.5 |
| 3,532,675 | 10/1970 | Rivlin | 260—78.5 |

JOSEPH L. SCHOFER, Primary Examiner

S. M. LEVIN, Assistant Examiner

U.S. Cl. X.R.

260—66, 78.5 R, 78.5 CL, 80.73, 80.76, 80.77, 80.81; 117—68, 124 E, 132 C, 155 UA

UNITED STATES PATENT OFFICE
CERTIFICATE OF CORRECTION

Patent No. 3,696,082　　　　　　　　　Dated October 3, 1972

Inventor(s) David R. Smith

It is certified that error appears in the above-identified patent and that said Letters Patent are hereby corrected as shown below:

Column 1, line 40, for "polyinvylidene" read ---polyvinylidene
Column 1, line 61, for "wegith" read ---weight---
Column 1, line 66, for "are" read ---art---
Column 1, line 71, for "25" read ---24---
Column 3, line 2, for "ethyl ether" read ---ethyl vinyl ether---
Column 3, lines 25-26, for "benbene" read ---benzene---
Column 4, line 6, for "hydrohulfite" read ---hydrosulfite---
Column 4, line 21, for "45°C." read ---45°C.)---
Column 4, line 36, for "periodic" read ---periodic)---
Column 7, line 27, for "rotataed" read ---rotated---
Column 9, line 15, for "performed" read ---preformed---

Signed and sealed this 17th day of April 1973.

(SEAL)
Attest:

EDWARD M. FLETCHER, JR.　　　　　　ROBERT GOTTSCHALK
Attesting Officer　　　　　　　　　Commissioner of Patents